US012699289B2

(12) United States Patent　(10) Patent No.:　US 12,699,289 B2
Kataoka et al.　(45) Date of Patent:　Aug. 4, 2026

(54) OPTICAL MODULATOR

(71) Applicant: SUMITOMO OSAKA CEMENT CO., LTD., Tokyo (JP)

(72) Inventors: Toshio Kataoka, Tokyo (JP); Norikazu Miyazaki, Tokyo (JP)

( * ) Notice: Subject to any disclaimer, the term of this patent is extended or adjusted under 35 U.S.C. 154(b) by 115 days.

(21) Appl. No.: 18/280,906

(22) PCT Filed: Sep. 30, 2021

(86) PCT No.: PCT/JP2021/036281
§ 371 (c)(1),
(2) Date: Sep. 7, 2023

(87) PCT Pub. No.: WO2023/053406
PCT Pub. Date: Apr. 6, 2023

(65) Prior Publication Data
US 2024/0160051 A1　May 16, 2024

(51) Int. Cl.
H04B 10/50 (2013.01)
G02F 1/01 (2006.01)

(52) U.S. Cl.
CPC ........... G02F 1/0121 (2013.01); H04B 10/50 (2013.01)

(58) Field of Classification Search
None
See application file for complete search history.

(56) References Cited

U.S. PATENT DOCUMENTS 7,242,868 B2 * 7/2007 Soto .................... H04J 14/0282
398/208
9,438,350 B1 9/2016 Schmidt 2005/0117904 A1 * 6/2005 Choi .................. H04B 10/1149
398/79
2006/0263095 A1 11/2006 Bai
2007/0237444 A1 * 10/2007 Keil ....................... B82Y 20/00
385/40
2010/0329600 A1 * 12/2010 Sugiyama .......... G02B 6/29352
385/2

(Continued)

FOREIGN PATENT DOCUMENTS

JP　2004-264628 A　9/2004
JP　2013-239830 A　11/2013

(Continued)

OTHER PUBLICATIONS

Nagatani Munehiko, et al, "A 110-GHz Bandwidth 2:1 AMUX-Driver IC using 250-nm InP DHBTs for Beyond-1-Tb/s/ carrier Optical Transmission Systems", IEEE, Nov. 3, 2019, pp. 1-4, XP033700158, DOI: 10.1109/BCICTS45179. 2019.8972726.

*Primary Examiner* — Nathan M Cors
(74) *Attorney, Agent, or Firm* — IpHorgan Ltd.

(57) ABSTRACT

The purpose of the present invention is to provide an optical modulator in which propagation loss related to transmission of a high-frequency signal is reduced. An optical modulator, in which an electro-optical conversion element E/OC and a driver circuit DRV for driving the electro-optical conversion element are housed in the same case CA, includes: a multiplexer MUX that converts an input modulation signal, which is input from an outside of the case, into an output modulation signal having a higher frequency than the input modulation signal, and supplies the output modulation signal to the driver circuit, in which the multiplexer is housed in the case CA.

4 Claims, 12 Drawing Sheets

(56) References Cited

U.S. PATENT DOCUMENTS

| | | | |
|---|---|---|---|
| 2011/0044573 A1* | 2/2011 | Webster | H04B 10/5053 |
| | | | 385/3 |
| 2014/0244880 A1 | 8/2014 | Soffer | |
| 2017/0126315 A1 | 5/2017 | Saito | |
| 2018/0284494 A1 | 10/2018 | Miyazaki | |
| 2019/0020416 A1* | 1/2019 | Huang | H04J 14/0256 |
| 2019/0041576 A1* | 2/2019 | Byrd | G02B 6/12004 |
| 2019/0237934 A1* | 8/2019 | Adachi | H04B 10/505 |
| 2023/0069120 A1 | 3/2023 | Ogiso | |

FOREIGN PATENT DOCUMENTS

| | | |
|---|---|---|
| JP | 2014-195061 A | 10/2014 |
| JP | 2017-085475 A | 5/2017 |
| JP | 2018-173595 A | 11/2018 |
| WO | 2021/171599 A1 | 9/2021 |

* cited by examiner (Top View)

(Side View)

(Top View)

(Side View)

OPTICAL MODULATOR

CROSS REFERENCE TO RELATED APPLICATIONS

This application is a national stage completion application of PCT Application No. PCT/JP2021/036281, filed Sep. 30, 2021. This PCT application is incorporated by reference herein in its entirety.

TECHNICAL FIELD

The present invention relates to an optical modulator, and more particularly to an optical modulator in which an electro-optical conversion element and a driver circuit for driving the electro-optical conversion element are housed in the same case.

BACKGROUND ART

In the fields of optical measurement technology and optical communication technology, optical modulators using materials having an electro-optic effect, such as lithium niobate and semiconductors, are often used. In particular, in order to achieve miniaturization and speeding-up of a coherent optical transmission apparatus, an optical modulator in which, for example, an amplifier (driver circuit) for driving an optical modulator, such as a high-bandwidth coherent driver modulator (HB-CDM), is mounted inside the optical modulator has been proposed. Moreover, in order to reduce the transmission loss of the high-frequency signal, the transmission line length between the digital signal processing apparatus (DSP) and the optical modulator is also shortened.

In an optical transmission apparatus incorporating an optical transmitter or an optical receiver using an optical modulator, the transmission line length becomes long in the electrical signal connection with the outside. Therefore, in general, a low-frequency signal is used and a parallel/serial conversion function for converting a low-frequency signal into a high-frequency signal, of a multiplexer (MUX) or the like, is provided inside the DSP mounted in the apparatus (see Patent Literatures 1 and 2).

At high speeds of 128 Gbaud (signal band over 100 GHz) or higher, the power consumption of the DSP further increases, and the MUX accommodates a multi-channel signal, so that speeding-up is considered unsuitable for reducing the power consumption and miniaturization of the DSP. Further, it is also required to reduce signal deterioration (reduction of electrical reflection/transmission loss) by reducing the number of components such as connectors in an optical transmission apparatus and shortening the transmission line length.

FIG. 1 is a plan view showing an example of an optical transmission apparatus OT in the related art. The DSP generates modulation signals (XI, XQ, YI, YQ) based on an input electrical signal ESin, and drives an optical modulator OM. In the DSP, the signal processing unit SP generates signals for a plurality of modulation signals based on the electrical signal ESin, and the multiplexer MUX performs parallel/serial conversion to perform signal multiplexing. Therefore, the modulation signal output from the DSP has a higher frequency, which causes an increase in loss in the transmission line between the DSP and the optical modulator OM. In particular, in a high-frequency interface such as an input connector for inputting an electrical signal from the outside of an optical modulator, the transmission line has a complicated structure, so that a transmission loss becomes extremely large.

In the optical modulator OM, a modulation signal is transmitted to a driver circuit DRV and amplified via a relay substrate RB. Further, the output signal of the driver circuit DRV is input to an electro-optical conversion element such as an optical modulation element, modulates a light wave input from the light source LS, and is output from the optical transmission apparatus OT as an optical signal LSout. In this way, the optical modulator OM functions as an optical transmitter.

The lower half of the optical transmission apparatus of FIG. 1 is an optical transmitter side, and the upper half is an optical receiver side. In an optical receiver OR, an optical signal LSin is input from the outside of an optical transmission apparatus OT, and the optical signal is demodulated using the light wave of the light source LS as reference light to generate electrical signals (XI, XQ, YI, YQ). These electrical signals are processed by the DSP and converted into output electrical signals. In the DSP, a serial/parallel conversion process is performed by a demultiplexer (DE-MUX), and a demultiplexing process is also performed.

CITATION LIST

Patent Literature

[Patent Literature No. 1] Japanese Laid-open Patent Publication No. 2017-085475
[Patent Literature No. 2] Japanese Laid-open Patent Publication No. 2013-239830

SUMMARY OF INVENTION

Technical Problem

An object to be solved by the present invention is to solve the above-mentioned problems and provide an optical modulator in which propagation loss related to transmission of a high-frequency signal is reduced.

Solution to Problem

In order to solve the above problems, an optical modulator of the present invention has the following technical features.

(1) An optical modulator, in which an electro-optical conversion element and a driver circuit for driving the electro-optical conversion element are housed in the same case, includes: a multiplexer that converts an input modulation signal, which is input from an outside of the case, into an output modulation signal having a higher frequency than the input modulation signal, and supplies the output modulation signal to the driver circuit, in which the multiplexer is housed in the case.

(2) In the optical modulator according to (1) above, the multiplexer and the driver circuit are incorporated into one chip circuit.

(3) In the optical modulator according to (1) or (2) above, the multiplexer is parallel/serial conversion means.

(4) In the optical modulator according to any one of (1) to (3) above, the multiplexer and the driver circuit are disposed on a flip-chip substrate.

(5) In the optical modulator according to (4) above, the electro-optical conversion element and the flip-chip substrate are electrically connected by a flip-chip bonding.

(6) In the optical modulator according to any one of (1) to (5) above, the input modulation signal is transmitted using a flexible printed circuit provided on the outside of the case.

(7) An optical transmitter including: the optical modulator according to any one of (1) to (6) above; and an electronic circuit that outputs the input modulation signal for causing the optical modulator to perform a modulation operation.

(8) An optical transmission apparatus including: the optical transmitter according to (7) above; and an optical receiver.

Advantageous Effects of Invention

In the present invention, there is provided an optical modulator, in which an electro-optical conversion element and a driver circuit for driving the electro-optical conversion element are housed in the same case, includes: a multiplexer that converts an input modulation signal, which is input from an outside of the case, into an output modulation signal having a higher frequency than the input modulation signal, and supplies the output modulation signal to the driver circuit, in which the multiplexer is housed in the case, so that an input modulation signal input to the optical modulator can be a low-frequency signal, and the propagation loss due to the signal transmission path can be reduced. Moreover, since the multiplexer, the driver circuit, and the electro-optical conversion element are housed in the same case, it is possible to shorten the wiring of each member to the utmost limit, and it is possible to further reduce the propagation loss of the modulation signal.

DESCRIPTION OF EMBODIMENTS

Hereinafter, an optical modulator of the present invention will be described in detail with reference to suitable examples.

As shown in FIGS. 2 to 12, the optical modulator of the present invention is an optical modulator OM, in which an electro-optical conversion element E/OC and a driver circuit DRV for driving the electro-optical conversion element are housed in the same case CA, includes: a multiplexer MUX that converts an input modulation signal, which is input from an outside of the case, into an output modulation signal having a higher frequency than the input modulation signal, and supplies the output modulation signal to the driver circuit, in which the multiplexer is housed in the case CA.

As the substrate forming the electro-optical conversion element, particularly the material for forming the optical waveguide, lithium niobate (LN), lithium tantalate (LiTaO₃), lanthanum zirconate titanate (PLZT), an indium phosphorus compound (InP), gallium arsenide-based (GaAs) and silicon-based (Si) materials, electro-optic (EO) polymers, and the like can be used.

Figure 1:
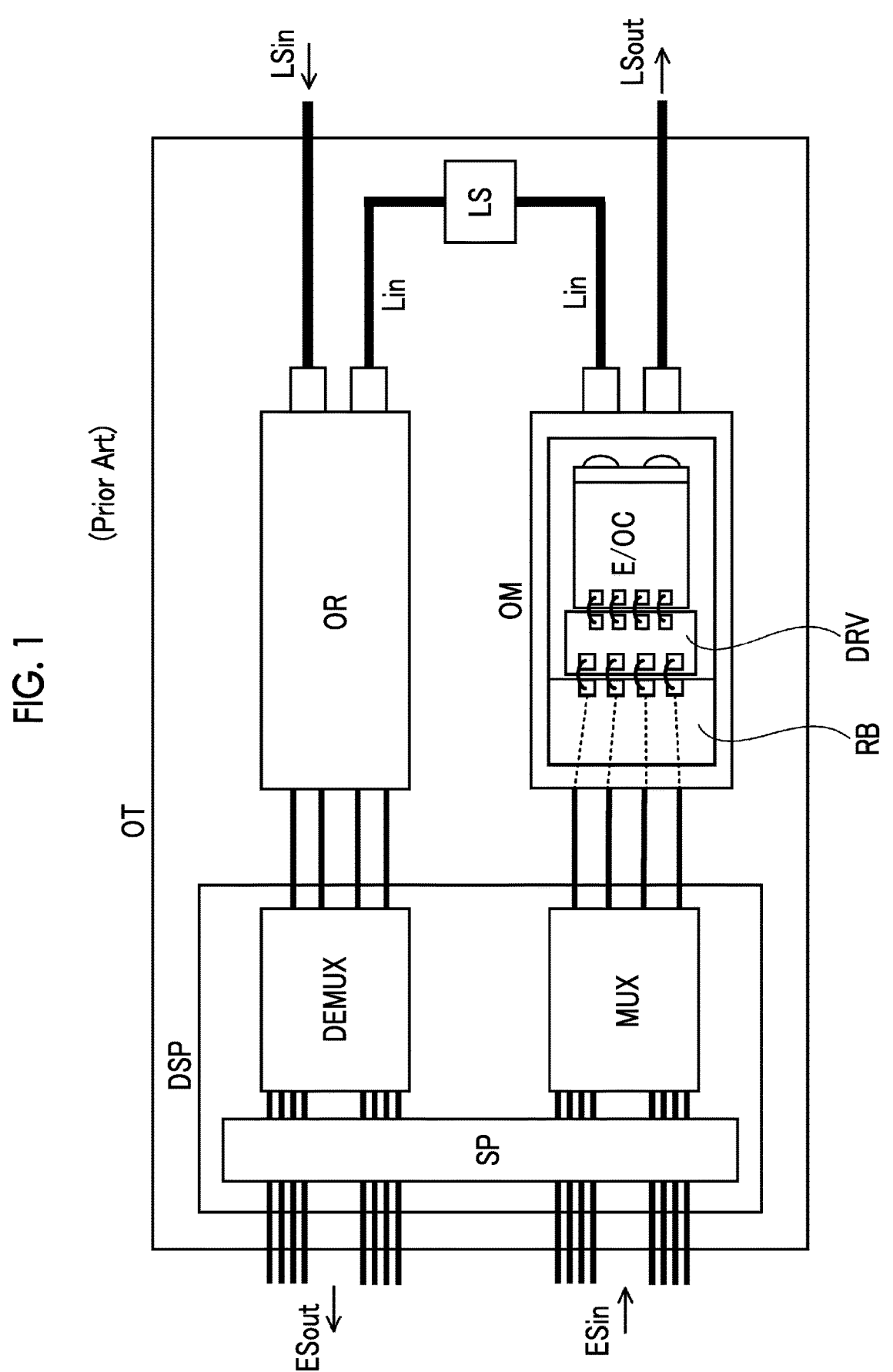
FIG. 1 is a plan view showing an example of an optical transmission apparatus in the related art.
Figure 2:
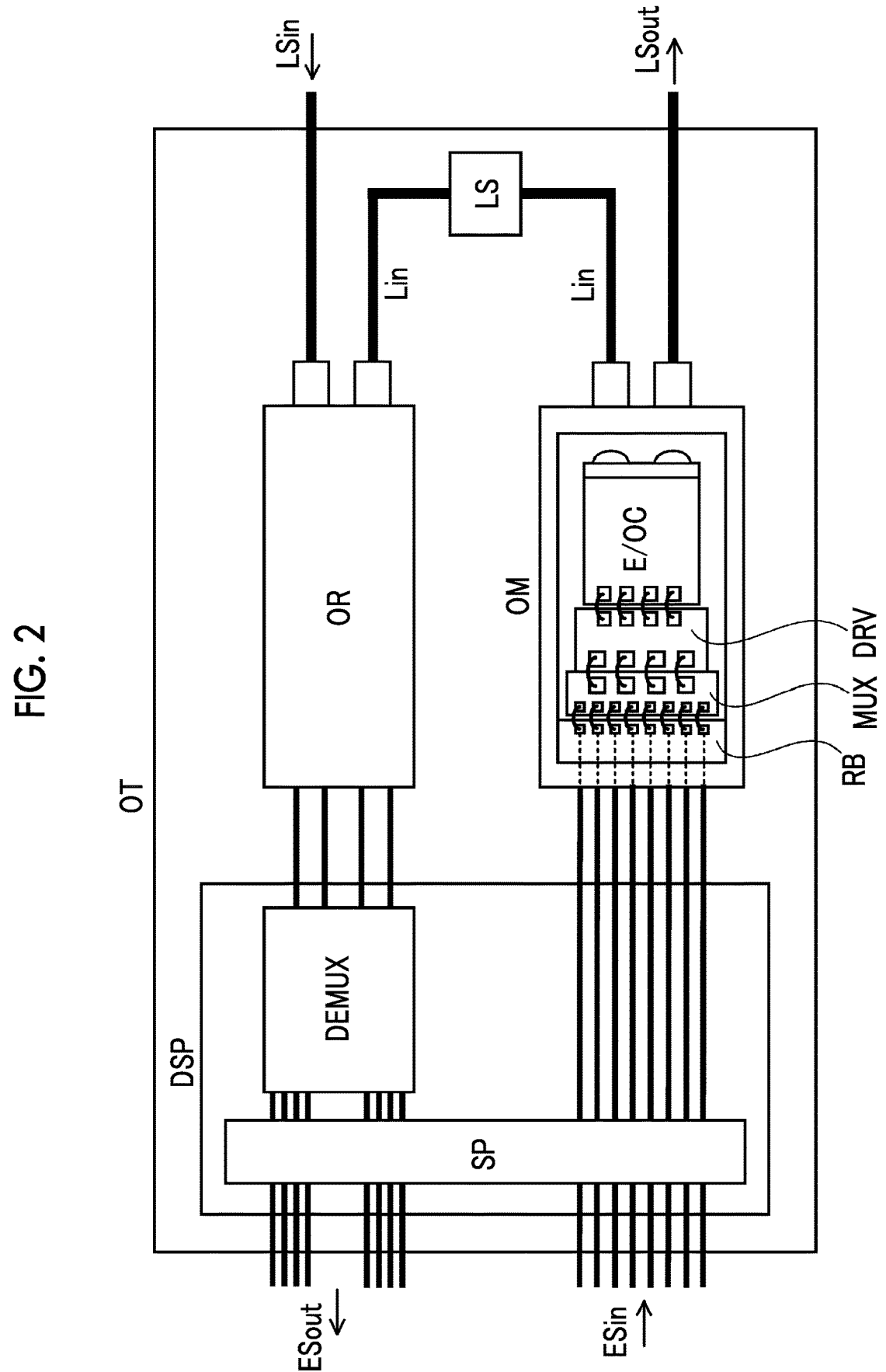
FIG. 2 is a plan view showing an example of an optical transmission apparatus according to the present invention.

As shown in FIG. 2, a feature of the present invention is that a multiplexer MUX (parallel/serial conversion unit), which has been disposed in a DSP in the related art, is housed (built-in) in a case CA of the optical modulator OM. As a result, the electrical signal of the optical modulator for external connection operates is a low-frequency (low-speed) signal and operates in multi-channel, and inside the optical modulator, the electrical signal is a high-frequency (high-speed) signal and operates at a small number of channels (a fraction of the number of external multi-channels), thereby implementing a modulation operation exceeding 100 GHz per channel. Reference numerals used in FIG. 2 and similar to those in FIG. 1 mean the same contents as the configuration of FIG. 1 described above.

With this configuration, the electrical signals transmitted between the DSP and the optical modulator are replaced with low-frequency signals. Specifically, when the channel ratio of the multiplexer MUX is 2:1, the frequency of the external electrical signal is ½. Therefore, not only the transmission line between the DSP and the optical modulator but also the speed of the signal input portion (high frequency interface portion) of the optical modulator in which signal deterioration is likely to occur is lowered. The channel ratio is not limited to 2:1 and can be 4:1 or 8:1, and in this case, the speed of the electrical signal transmitted between the DSP and the optical modulator can be lowered.

On the other hand, inside the optical modulator, deterioration of a high-frequency (high-speed) signal is reduced by shortening the signal wiring portion after the built-in multiplexer MUX. Further, by lowering the speed of the electrical signal outside the optical modulator, there are many advantages such as securing a degree of freedom in line design between the optical modulator and the DSP line.

However, in a case where the multiplexer MUX is housed in the case of the optical modulator, the number of electrical signal transmission lines connecting the inside and outside of the case is doubled. In order to secure a multi-channel transmission line, in addition to increasing the number of wires in a connector (CN) such as a connector pin in the related art, it is also possible to dispose a plurality of cables using a flexible printed circuit (FPC) capable of surface mounting or use multi-point connection by a ball grid array (BGA).

When the MUX is built in the optical modulator, the interface of the optical modulator accommodates a multi-channel signal as compared with the related art, so that there are more signal connections. Therefore, as described above, it is possible to implement multi-channel signal connection in a limited space by making using a plurality of flexible printed circuits and multi-point connection by BGA.

Further, in FIG. 2 and each drawing described later, the width of the multiplexer MUX (height in the vertical direction in the drawing) is wider than the width of the driver circuit DRV. Therefore, the size of the case also becomes slightly larger due to the multiplexer MUX.

In the optical modulator of the present invention, for example, it is also important to reduce the transmission loss from the multiplexer MUX to the driver circuit and from the driver circuit to the electro-optical conversion element, which is a high-frequency signal wiring of 128 Gbaud (signal band over 100 GHz). For this purpose, as will be described later, the multiplexer MUX may be mounted on a substrate, and electrical connection with a relay substrate or an electro-optical conversion element mounted inside the optical modulator may be implemented by a flip-chip bond connection.

Hereinafter, an optical modulator of the present invention will be described in detail with reference to each embodiment.

Figure 3:
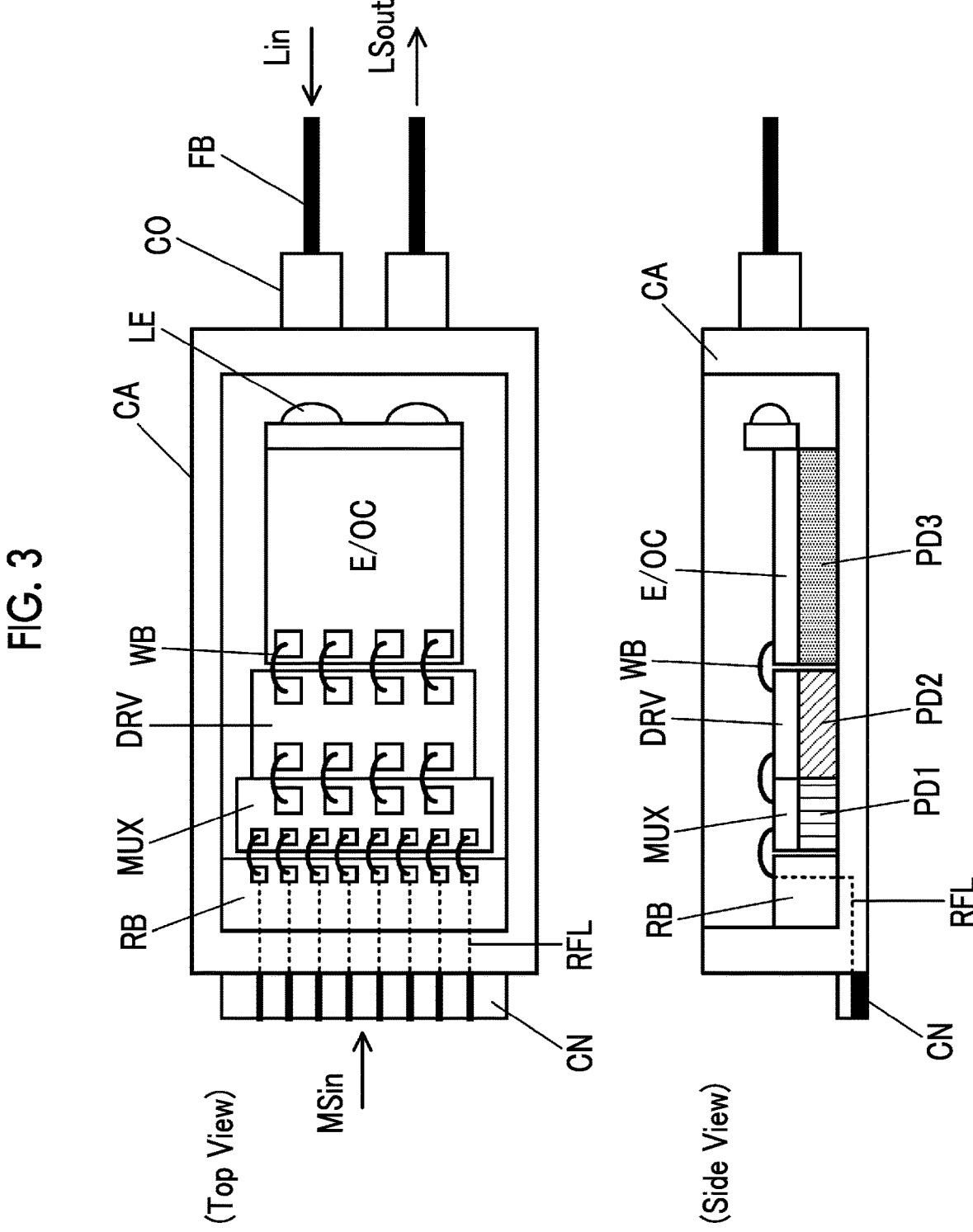
FIG. 3 is a plan view and a side view showing a first embodiment of the optical modulator according to the present invention.

FIG. 3 is a plan view and a side view showing a first embodiment of the optical modulator, and a multiplexer MUX is built in the case CA. This multiplexer can reduce the frequency of the input modulation signal MSin by using the parallel/serial conversion means.

The input modulation signal MSin is introduced into the case through the connector CN. The introduction line is a high-frequency line (RFL) through which microwaves propagate. The relay substrate RB, the multiplexer MUX, the driver circuit DRV, and the electro-optical conversion element E/OC are linearly arranged in the case CA. This is to reduce the propagation loss in response to high-frequency electrical signals. The relay substrate RB and the multiplexer MUX, the multiplexer MUX and the driver circuit DRV, and further, the driver circuit DRV and the electro-optical conversion element are connected by a wire bonding connection WB, respectively.

In recent years, the driver circuit used in the HB-CDM consumes several W of electric power, and similarly consumes the multiplexer MUX mounted on the DSP. Since these electric powers are converted into heat, a configuration for heat dissipation is required. For example, it is possible to enhance the heat dissipation effect by using a metal with good thermal conductivity for the case, a pedestal PD1 that supports the multiplexer, a pedestal PD2 that supports the driver circuit, and a pedestal PD3 that supports the electro-optical conversion element.

As the meaning of each reference numeral used in FIG. 3, LE means a lens that collects light waves entering and exiting the electro-optical conversion element, CO means a lens barrel of a collimator lens, and FB means an optical fiber. Unless otherwise specified, in FIG. 4 and subsequent drawings, the same reference numerals as those in FIG. 3 mean the same configuration elements.

Figure 4:
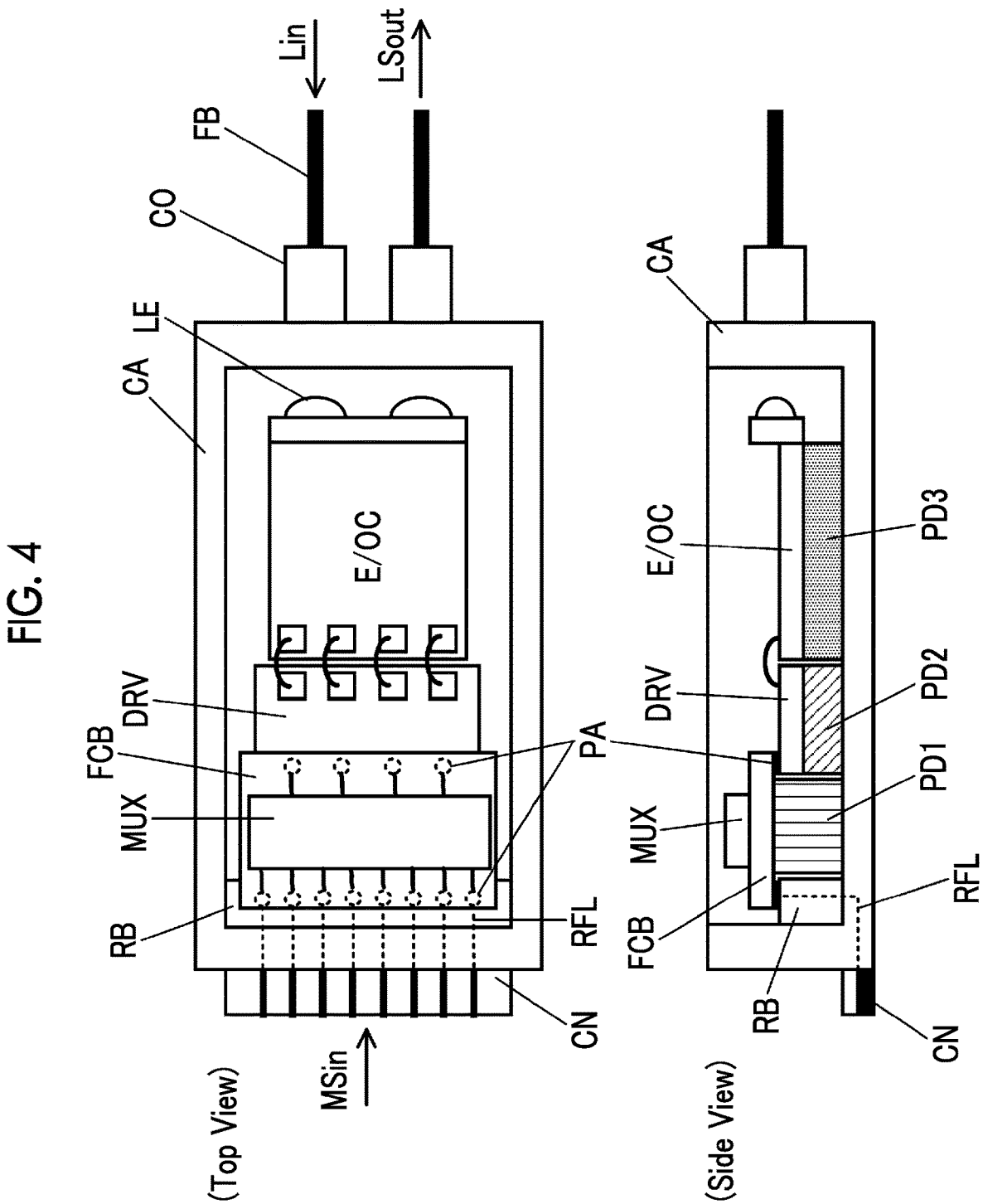
FIG. 4 is a plan view and a side view showing a second embodiment of the optical modulator according to the present invention.

FIG. 4 is a plan view and a side view showing a second embodiment of the optical modulator.

The multiplexer MUX which is disposed on the flip-chip substrate FCB, and the flip-chip substrate FCB and the relay substrate RB, and the flip-chip substrate FCB and the driver circuit DRV are electrically connected by a flip-chip bond connection. This makes it possible to implement high-frequency signal wiring in which electrical reflection and line loss are reduced. Reference numeral PA means a pad portion used for the flip-chip bond connection.

Figure 5:
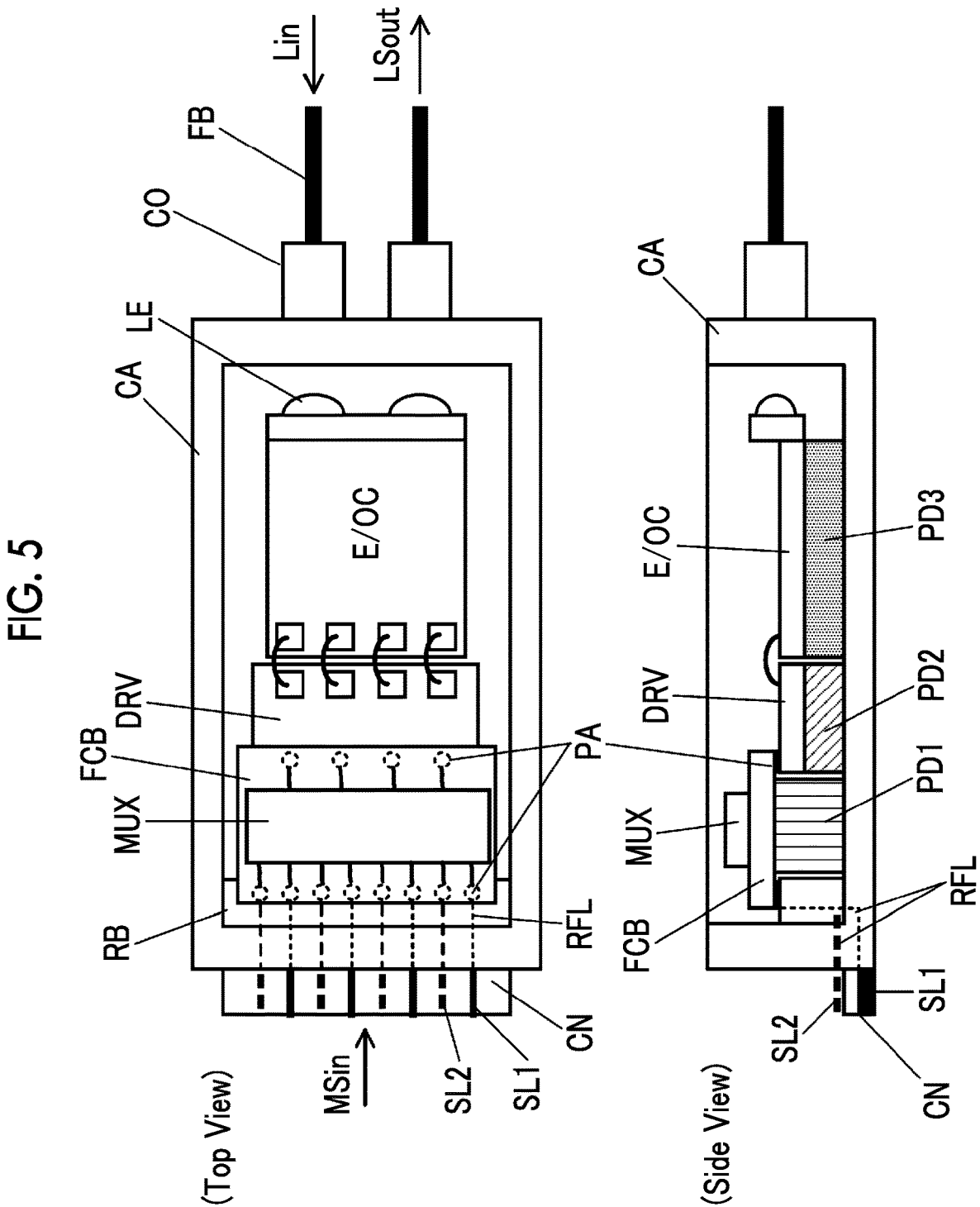
FIG. 5 is a plan view and a side view showing a third embodiment of the optical modulator according to the present invention.

FIG. 5 is a plan view and a side view showing a third embodiment of the optical modulator. In addition to the second embodiment shown in FIG. 4, the connector CN that receives the input modulation signal from the outside is changed. Specifically, the high-frequency interface wiring portion, which is a transmission line of the modulation signal, is disposed on both the front surface side and the back surface side of the insulating substrate configuring the connector. With this configuration, adjacent transmission lines can be separated from each other, and crosstalk of modulation signals can be reduced. The number of external connection terminals is increased by housing the multiplexer MUX in the case. However, in the third embodiment, the number of wirings can be increased without increasing the size of the connector CN.

Figure 6:
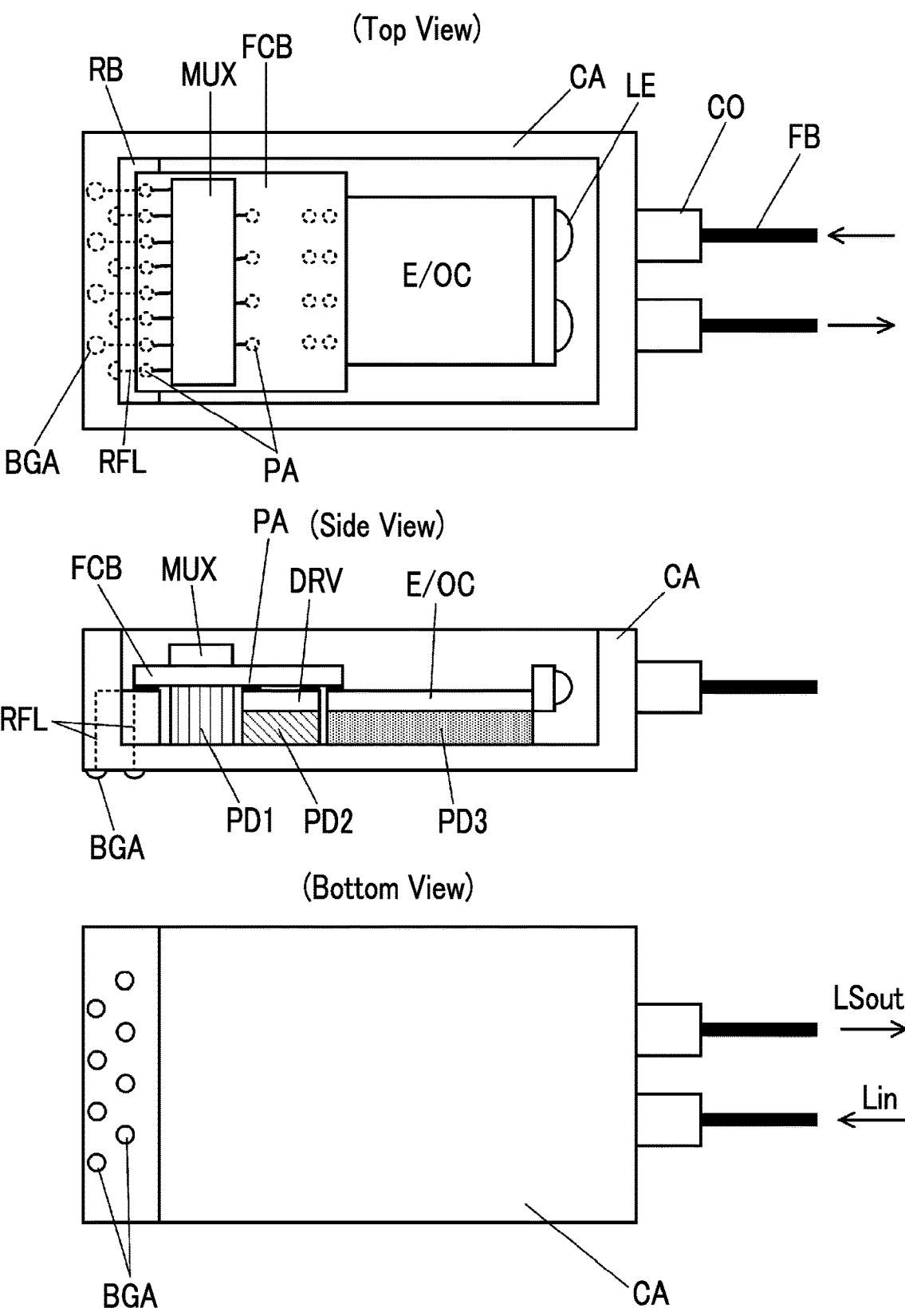
FIG. 6 is a plan view, a side view, and a back view showing a fourth embodiment of the optical modulator according to the present invention.

FIG. 6 is a plan view, a side view, and a bottom view showing a fourth embodiment of the optical modulator. In the same manner as in the second embodiment, the multiplexer MUX is fixed to the flip-chip substrate, and each member is subjected to flip-chip bond connection. Further, by using the ball grid array terminal (BGA) for the high-frequency interface connection with the outside, it is possible to shorten the signal connection with the DSP. In addition, these configurations make it possible to implement high-frequency signal wiring in which electrical reflection and line loss are reduced.

Figure 7:
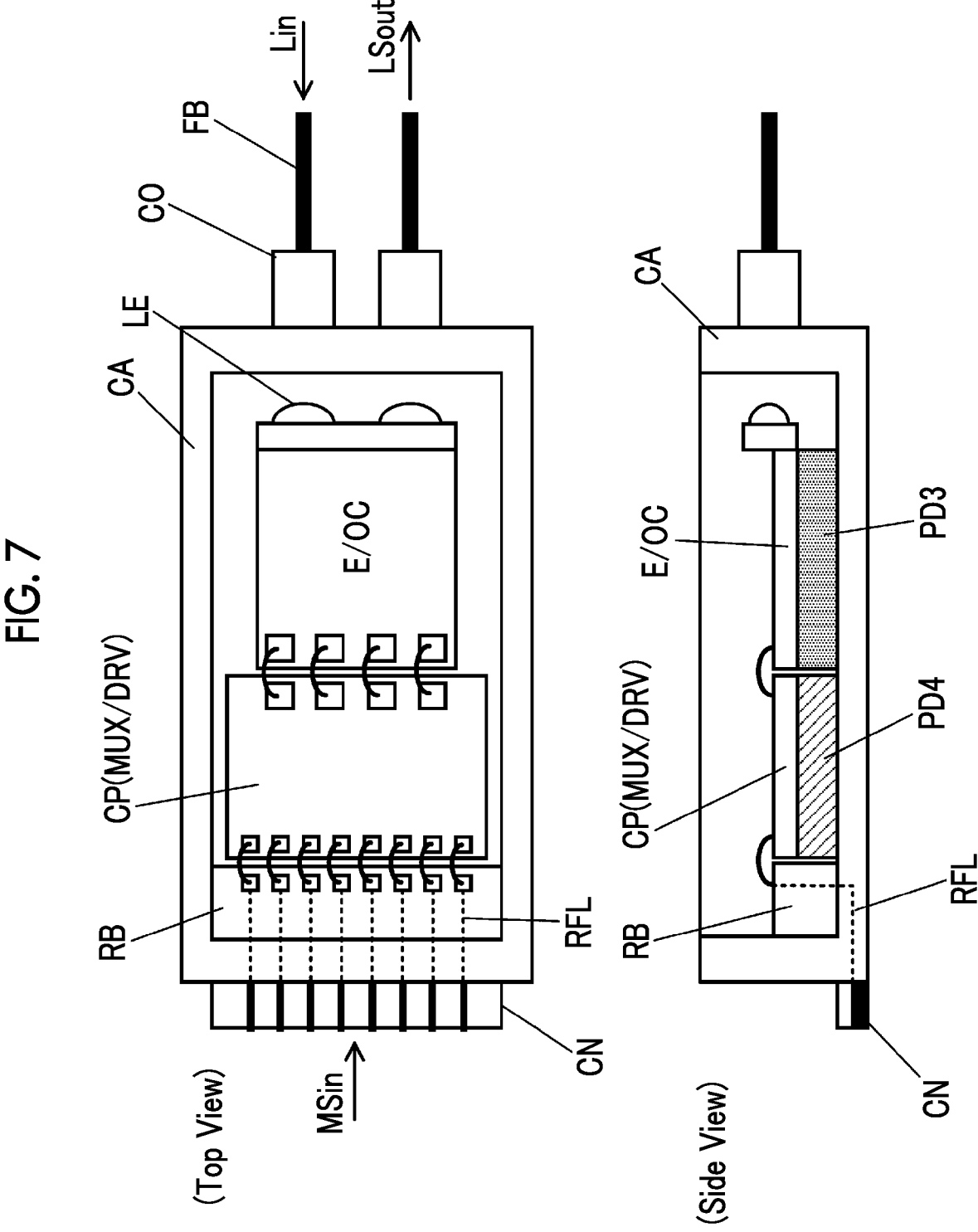
FIG. 7 is a plan view and a side view showing a fifth embodiment of the optical modulator according to the present invention.

FIG. 7 is a plan view and a side view showing a fifth embodiment of the optical modulator. A feature of the fifth embodiment is that the multiplexer MUX and the driver circuit DRV are incorporated into one chip circuit CP. By reducing the number of connection points of the signal wiring portion by this one-chip integration, high-frequency signal wiring with reduced electrical reflection and line loss is implemented. By one-chip integration, elements that consume a large amount of electric power are concentrated in a small region. Therefore, a configuration that enhances conductivity is indispensable for the pedestal PD4 that supports the chip circuit CP.

Figure 8:
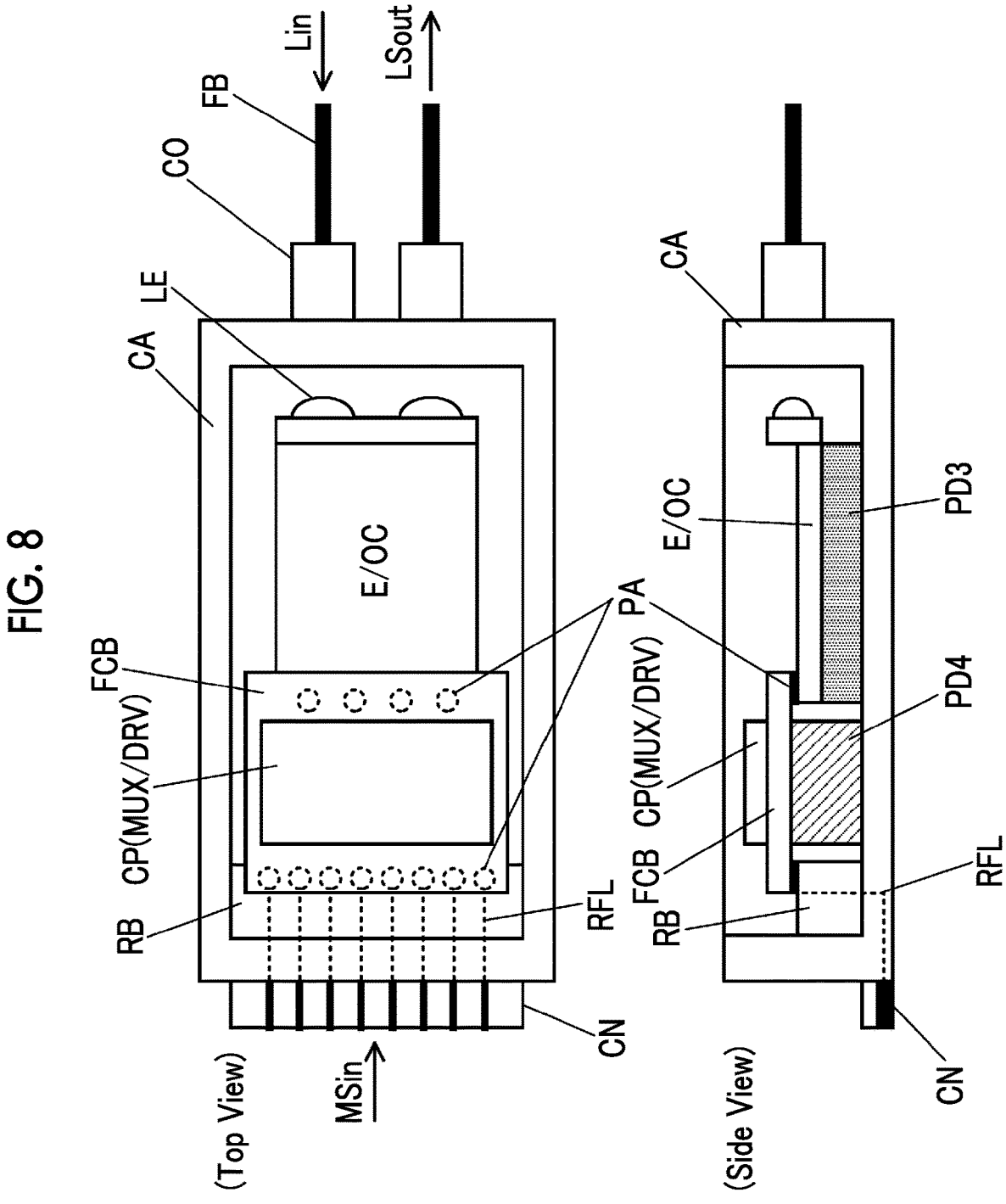
FIG. 8 is a plan view and a side view showing a sixth embodiment of the optical modulator according to the present invention.

FIG. 8 is a plan view and a side view showing a sixth embodiment of the optical modulator. In addition to the one-chip integration configuration of the fifth embodiment, the chip circuit CP is disposed and fixed on the flip-chip substrate FCB, and the electrical connection with the relay substrate RB and the electro-optical conversion element E/OC is made by a flip-chip bond connection, so that high-frequency signal wiring with reduced electrical reflection and line loss is implemented.

Figure 9:
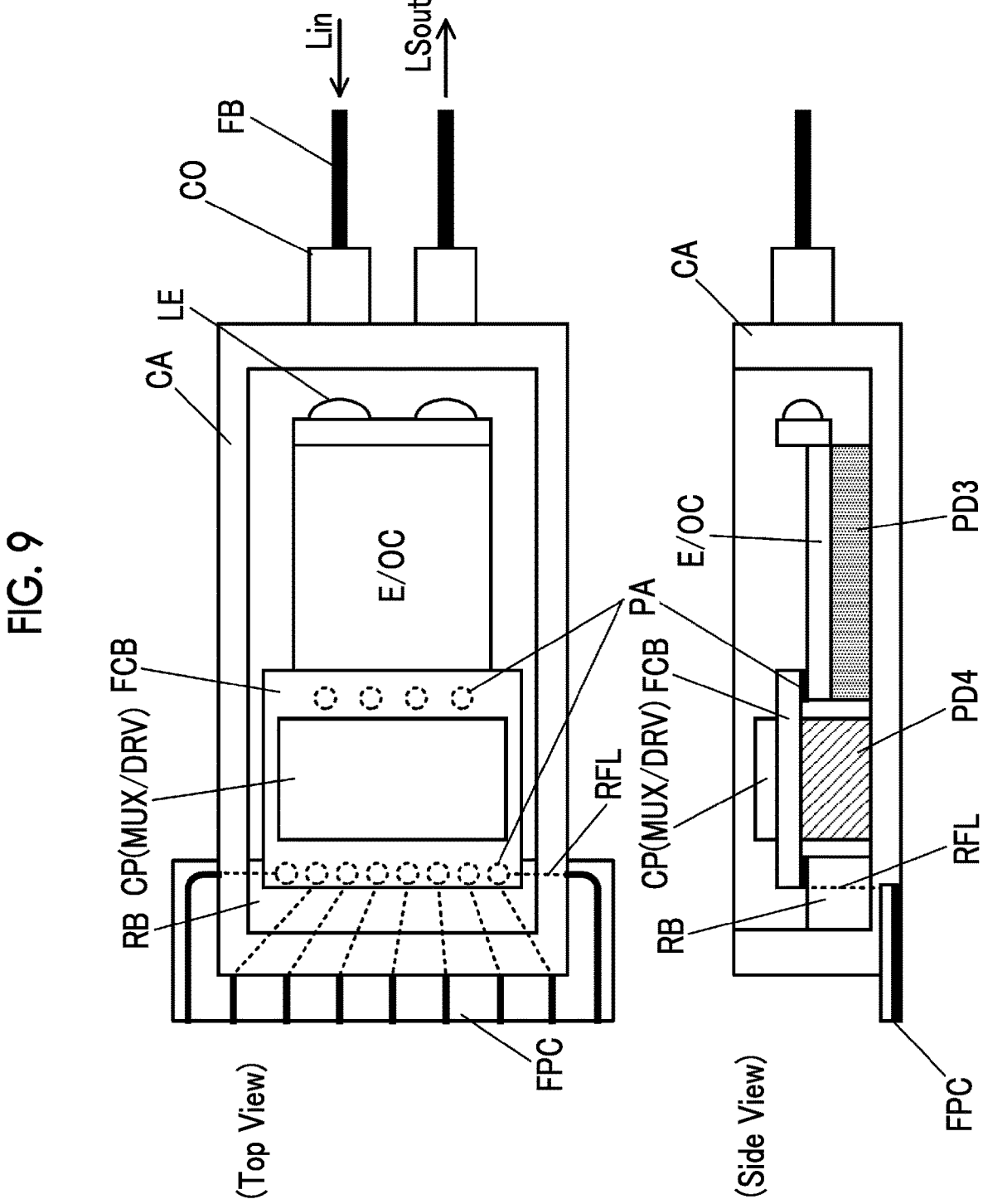
FIG. 9 is a plan view and a side view showing a seventh embodiment of the optical modulator according to the present invention.
Figure 10:
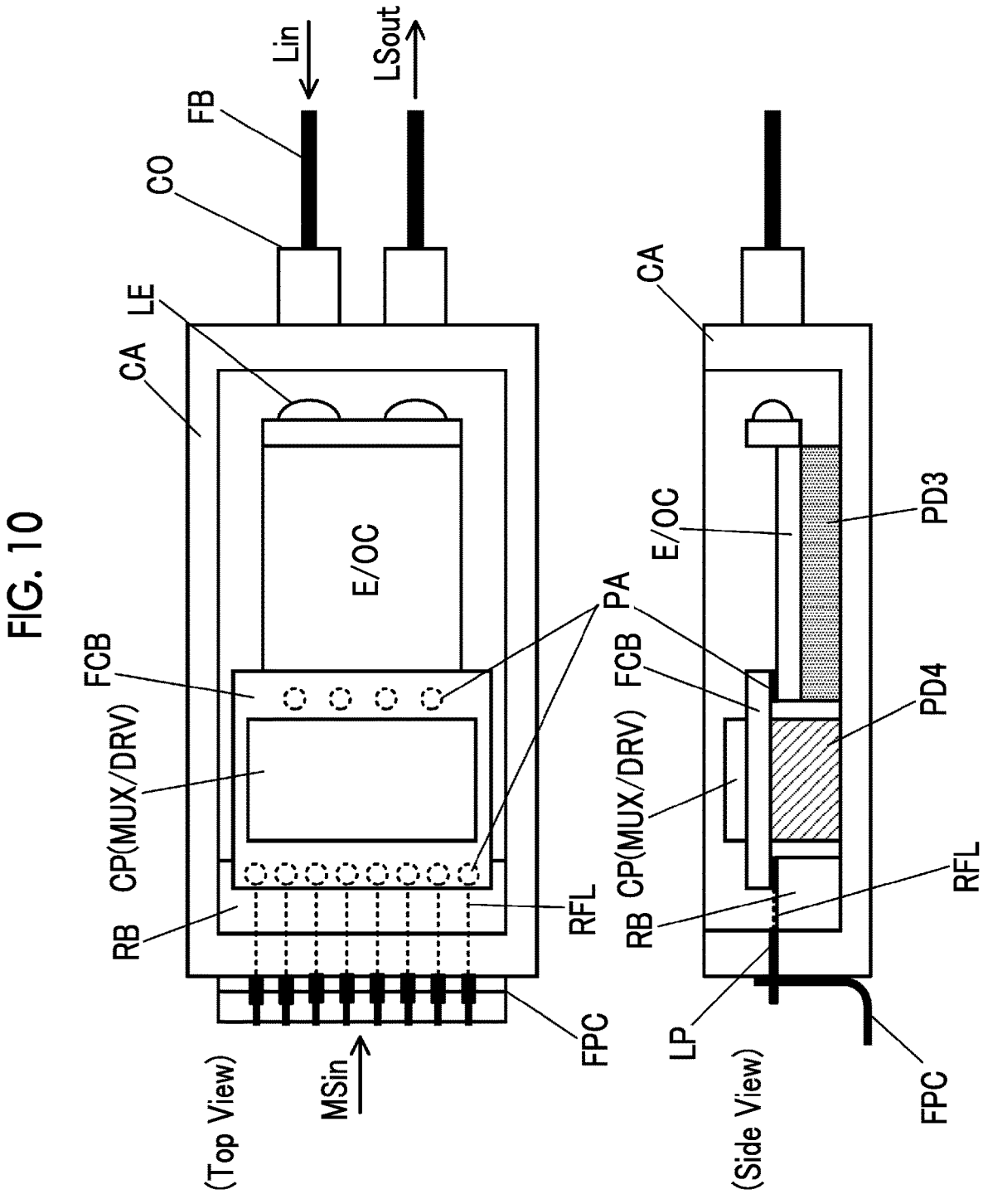
FIG. 10 is a plan view and a side view showing an eighth embodiment of the optical modulator according to the present invention.

FIG. 9 is a plan view and a side view showing a seventh embodiment of the optical modulator, and FIG. 10 is a plan view and a side view showing an eighth embodiment of the optical modulator.

Features of these embodiments is that the input modulation signal MSin is transmitted using a flexible printed circuit FPC (also referred to as a "flexible cable") provided on the outside of the case CA. By using the flexible printed circuit FPC, it is possible to shorten the length of the signal line.

In FIG. 9, the flexible printed circuit FPC is electrically connected in the bottom surface of the case CA, and in FIG. 10, the flexible printed circuit FPC and the relay substrate RB are electrically connected via the lead pin LP penetrating the side wall of the case CA.

Further, in FIG. 10, the flexible printed circuit FPC is disposed using only one side surface of the case CA. Not limited to this, it is also possible to dispose a plurality of flexible printed circuit FPCs on a plurality of side surfaces of the case to increase the number of wirings or increase the clearance between the wirings.

Figure 11:
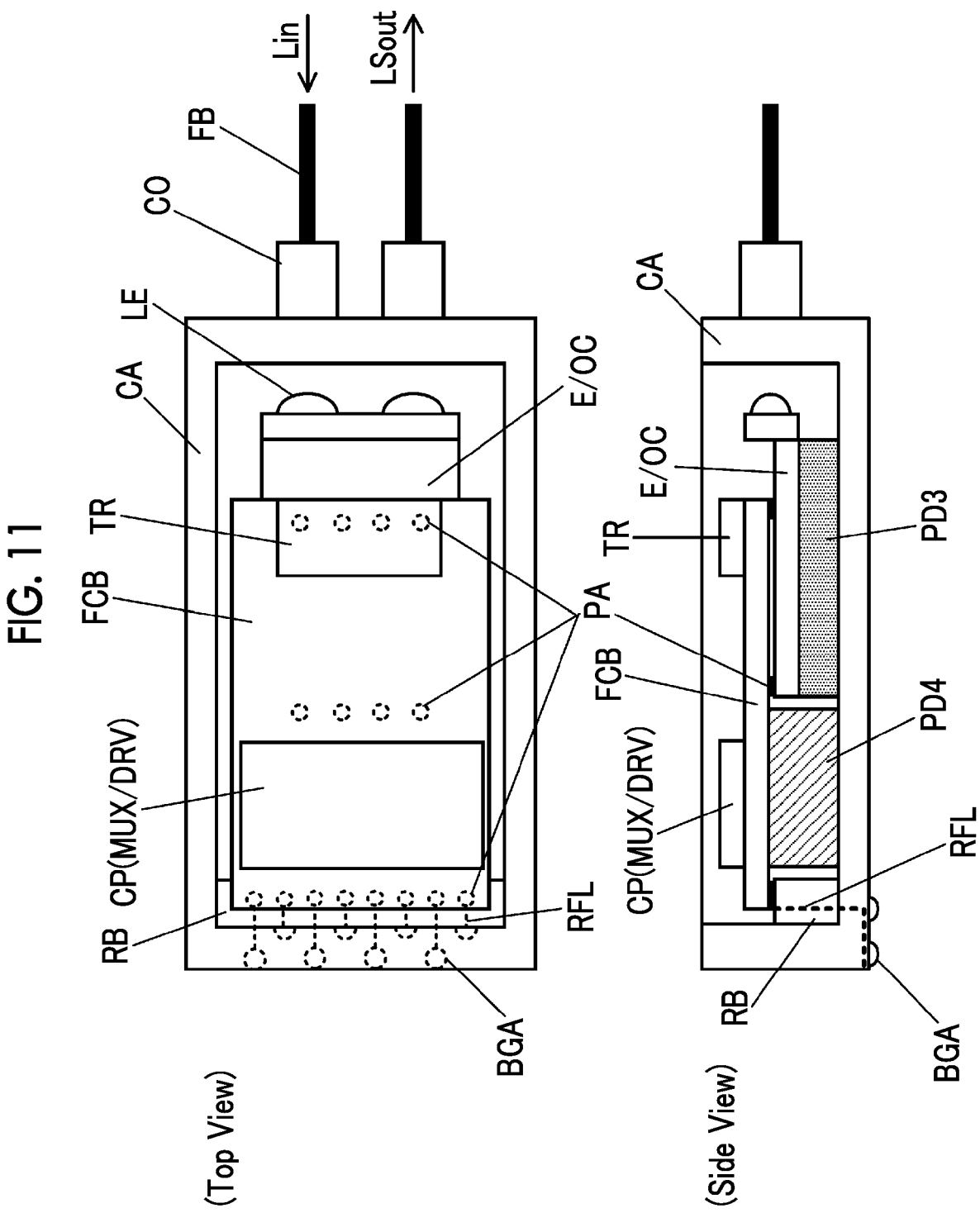
FIG. 11 is a plan view and a side view showing a ninth embodiment of the optical modulator according to the present invention.

FIG. 11 is a plan view and a side view showing a ninth embodiment of the optical modulator. A feature of the ninth embodiment is that a relay substrate and an electro-optical conversion element are electrically connected by using a flip-chip substrate FCB on which a chip circuit CP integrated as one chip is mounted. This configuration makes it possible to simplify manufacturing and assembly. Further, in FIG. 11, a termination resistor TR for terminating the modulation signal applied to the electro-optical conversion element is provided on the flip-chip substrate FCB to simplify the electro-optical conversion element E/OC. Since the heat generated by the termination resistor cannot be ignored, it also contributes to separating the termination resistor and the electro-optical conversion element.

Figure 12:
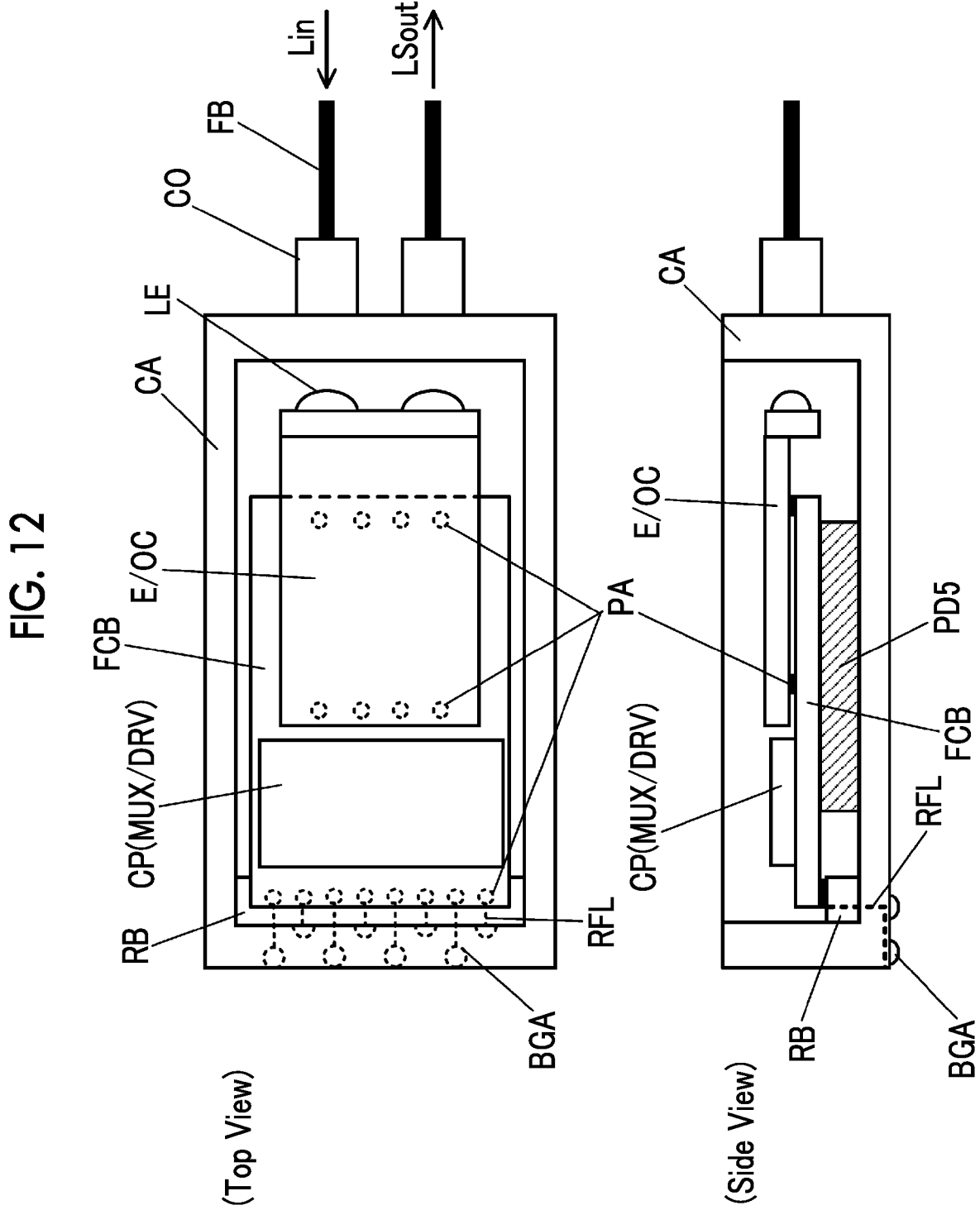
FIG. 12 is a plan view and a side view showing a tenth embodiment of the optical modulator according to the present invention.

FIG. 12 is a plan view and a side view showing a tenth embodiment of the optical modulator. A feature of the tenth embodiment is that the contact area between the flip-chip substrate FCB and the pedestal PD is increased, and the heat generated by the chip circuit CP is efficiently dissipated. With this configuration, the electro-optical conversion element E/OC is disposed on the flip-chip substrate FCB.

INDUSTRIAL APPLICABILITY

As described above, according to the present invention, it is possible to provide an optical modulator in which propagation loss related to transmission of a high-frequency signal is reduced. Further, it is also possible to provide an optical transmitter using the optical modulator, and further, an optical transmission apparatus using the optical transmitter.

REFERENCE SIGNS LIST

CA Case
CN Connector

DRV Driver circuit
E/OC Electro-optical conversion element
MUX Multiplexer (parallel/serial conversion)

The invention claimed is:

1. An optical modulator in which an electro-optical conversion element and a driver circuit for driving the electro-optical conversion element are housed in the same case, comprising:

a multiplexer that converts an input modulation signal, which is input from an outside of the case, into an output modulation signal having a higher frequency than the input modulation signal, and supplies the output modulation signal to the driver circuit, wherein the multiplexer and the driver circuit are disposed on a flip-chip substrate, the flip-chip substrate is housed in the case, the input modulation signal is transmitted using a flexible printed circuit provided on the outside of the case, a termination resistor for terminating the modulation signal applied to the electro-optical conversion element is provided on the flip-chip substrate, and the multiplexer, the driver circuit, the electro-optical conversion element and the termination resistor are linearly arranged along the flip-chip substrate.

2. The optical modulator according to claim 1, wherein the multiplexer is parallel/serial conversion means.

3. The optical modulator according to claim 1, wherein the electro-optical conversion element and the flip-chip substrate are electrically connected by a flip-chip bonding.

4. The optical modulator according to claim 1, wherein the termination resistor is provided on one side of the flip-chip substrate and the electro-optical conversion element on the other side of the flip-chip substrate.

* * * * *